United States Patent [19]

Kelley et al.

[11] 4,339,228
[45] Jul. 13, 1982

[54] POWER UNIT FOR SINGLE LINE PNEUMATIC TUBE SYSTEM

[75] Inventors: Charles K. Kelley; William W. Jones, both of Houston, Tex.

[73] Assignee: C. K. Kelley and Sons, Inc., Houston, Tex.

[21] Appl. No.: 38,167

[22] Filed: May 11, 1979

Related U.S. Application Data

[62] Division of Ser. No. 876,112, Feb. 8, 1978, Pat. No. 4,189,261.

[51] Int. Cl.³ .............................................. F04D 29/40
[52] U.S. Cl. .................................. 415/219 R; 415/200
[58] Field of Search .................. 406/13, 111, 112; 415/219 R, 121 R, 200; 15/327 R, 327 F, 327 A, 327 B, 327 E

[56] References Cited

U.S. PATENT DOCUMENTS

| | | | |
|---|---|---|---|
| 1,862,057 | 6/1932 | Lewis | 220/22 X |
| 2,414,366 | 1/1947 | Elze et al. | 415/200 X |
| 2,486,619 | 11/1949 | Troxler | 415/200 |
| 2,632,524 | 3/1953 | Senne | 417/423 A |
| 3,232,559 | 2/1966 | Grosswiller, Jr. et al. | 406/111 X |
| 3,799,703 | 3/1974 | Paine et al. | 415/119 X |
| 3,976,264 | 8/1976 | Ekama et al. | 406/112 |
| 4,059,246 | 11/1977 | Anders et al. | 415/119 X |
| 4,130,374 | 12/1978 | Bingler | 417/423 R |
| 4,174,020 | 11/1979 | Challis | 415/119 X |
| 4,189,261 | 2/1980 | Kelley et al. | 406/112 |

OTHER PUBLICATIONS

Processes and Materials of Manufacture, Lindberg, Allyn and Bacon, Inc., Boston, 1964, pp. 366-367.

Primary Examiner—Leonard E. Smith
Attorney, Agent, or Firm—James C. Wray

[57] ABSTRACT

A pressure-vacuum chamber is mounted in a sheet metal housing having acoustical padding on inner surfaces of walls. The chamber has two vacuum-formed truncated cone members and a longitudinally extending axial partition plate sealingly mounted in inward facing grooves in the members. A flow-through blower is sealingly mounted in aperture in the plate.

10 Claims, 4 Drawing Figures

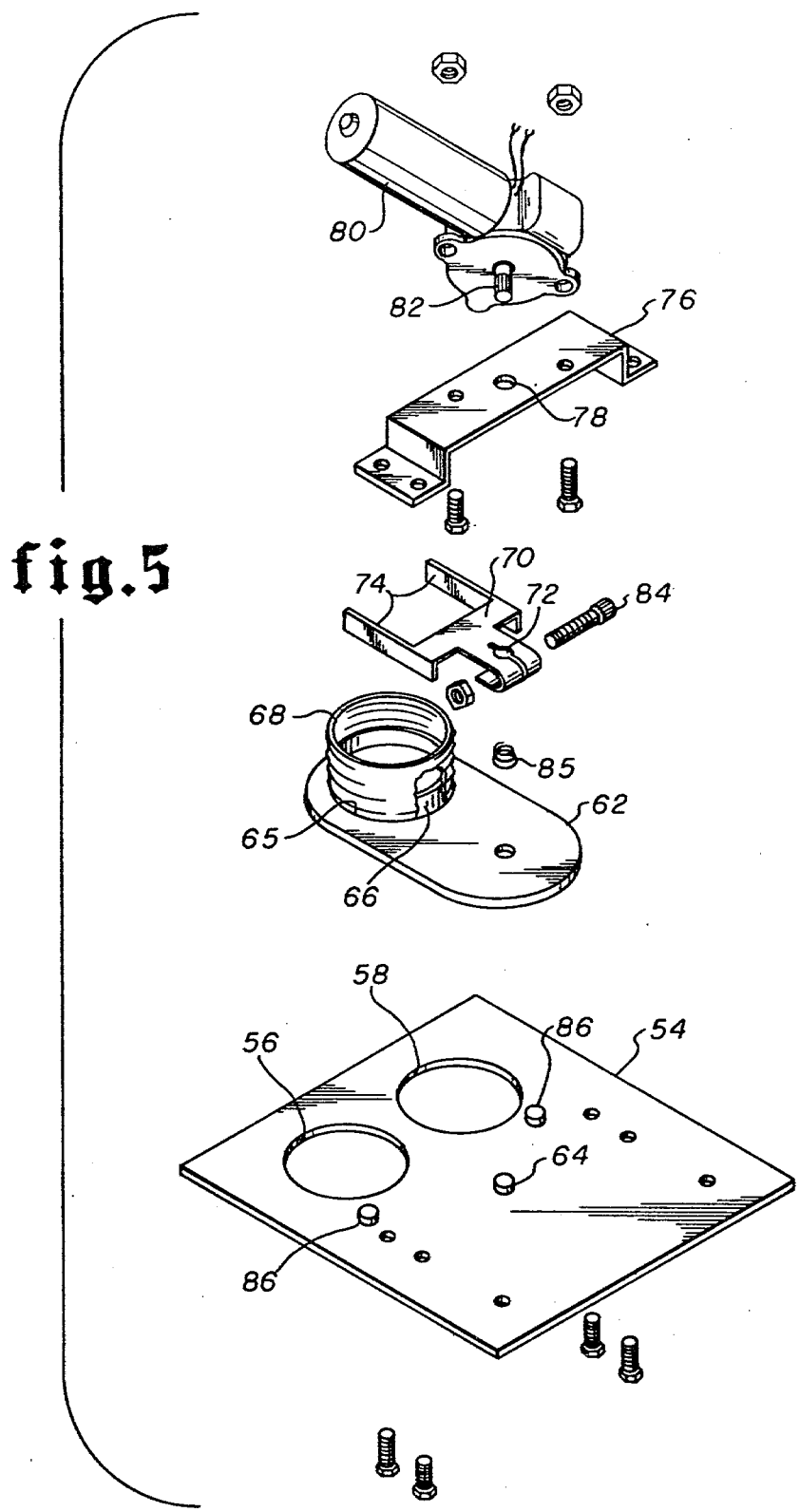

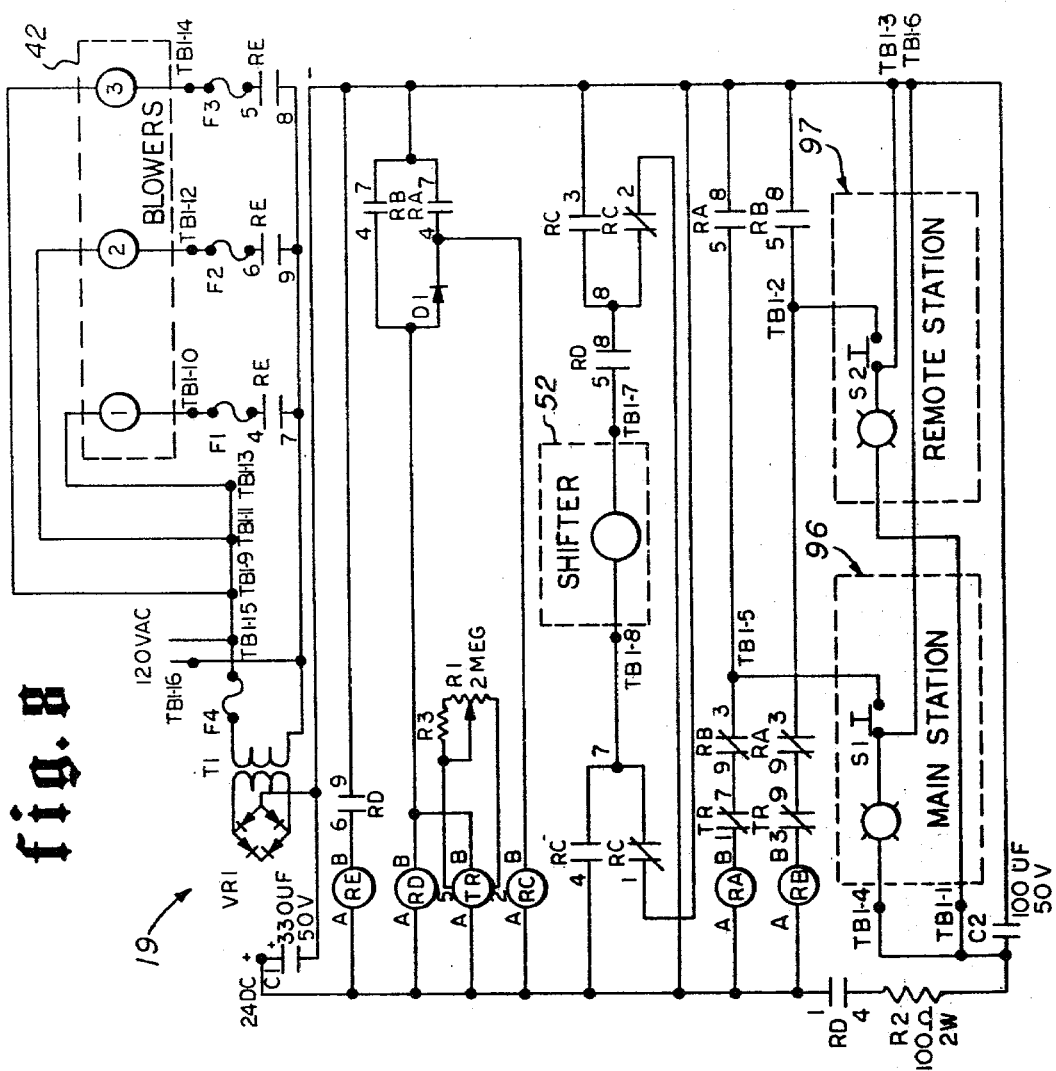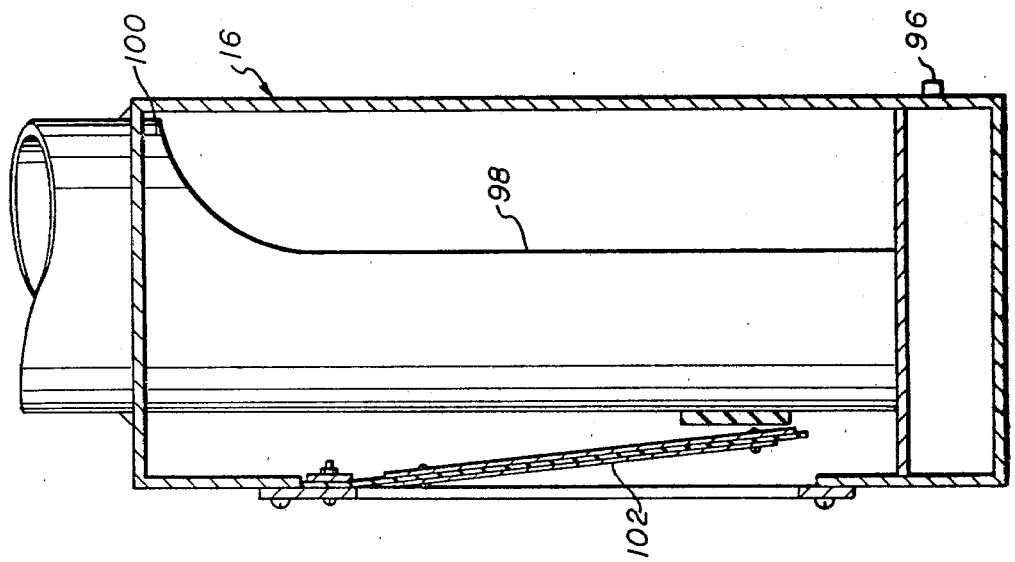

POWER UNIT FOR SINGLE LINE PNEUMATIC TUBE SYSTEM

This is a division, of application serial no. 876,112, filed Feb. 8, 1978, now U.S. Pat. No. 4,189,261.

BACKGROUND OF THE INVENTION

This invention relates to a unitized single line (pressure-vacuum) pneumatic tube system capable of incorporating intermediate stations, and novel components therefor.

Traditionally, pneumatic tube systems which deliver carriers to one or several locations and back have been custom designed, requiring extensive engineering and selection of various components. Single line pneumatic tube systems are well known in the prior art as exemplified by U.S. Pat. Nos. 2,137,750 and 3,232,559 and are utilized for drive-in banking and tolls as shown in U.S. Pat. No. 3,599,898 and 3,976,264. Such systems normally use a high powered turbine to provide the necessary air; however, the noise level of the turbine is such that the turbines are located at a remote location from the terminals. Moreover, the air shifter valve for such a system is usually complicated and changes the direction of flow causing turbulence. Although some single line systems do use smaller blowers, they require a blower at each terminal location.

Accordingly, a need has existed for a unitized system which can be packaged and sold by the manufacturer as a complete system eliminating custom design. Also, there is a need for a simple single line pneumatic tube system having a single power unit which is sufficiently quiet that it can be installed in a room where people are working. There is also a need for an air shifter which eliminates changing direction of the air. Further, there is a need for a single line pneumatic tube system which has a minimum of noise at the end terminal and which can include intermediate terminals which can transmit a carrier in either direction without complicated valving.

SUMMARY OF THE INVENTION

The single line pneumatic tube system of the present invention is comprised basically of a central station, including a power unit and a central terminal; an end terminal; tubing connecting the terminals; and low voltage wiring. Intermediate terminals capable of transmitting a carrier in either direction may be included. The power unit includes a pressure-vacuum chamber formed of a housing having a partition plate dividing the housing into two sealed chambers. One or more through flow blowers extend through the plate. The pressure-vacuum chamber has two spaced ports.

BRIEF DESCRIPTION OF THE DRAWINGS

A preferred embodiment of the invention—illustrative of the best mode in which applicants have contemplated applying the principles—is set forth in the following description and shown in the drawings, and is particularly and distinctly pointed out and set forth in the appended claims.

DESCRIPTION OF THE PREFERRED EMBODIMENT

Figure 2:
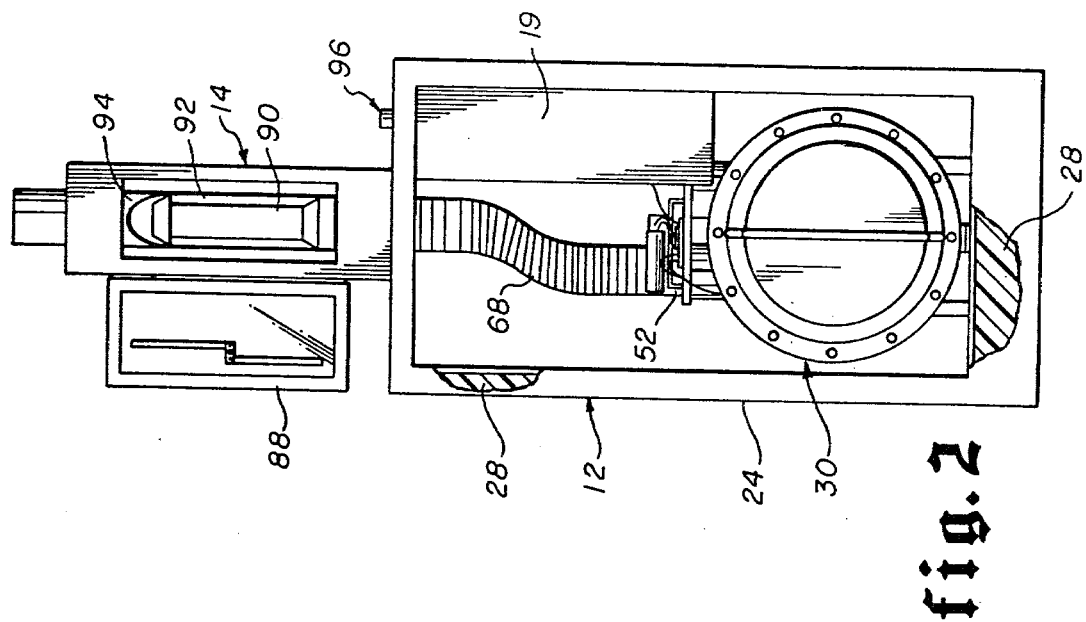
FIG. 2 is a front elevational view of the central station and power unit with the front cover of the power unit removed and the door of the central station open.
Figure 1:
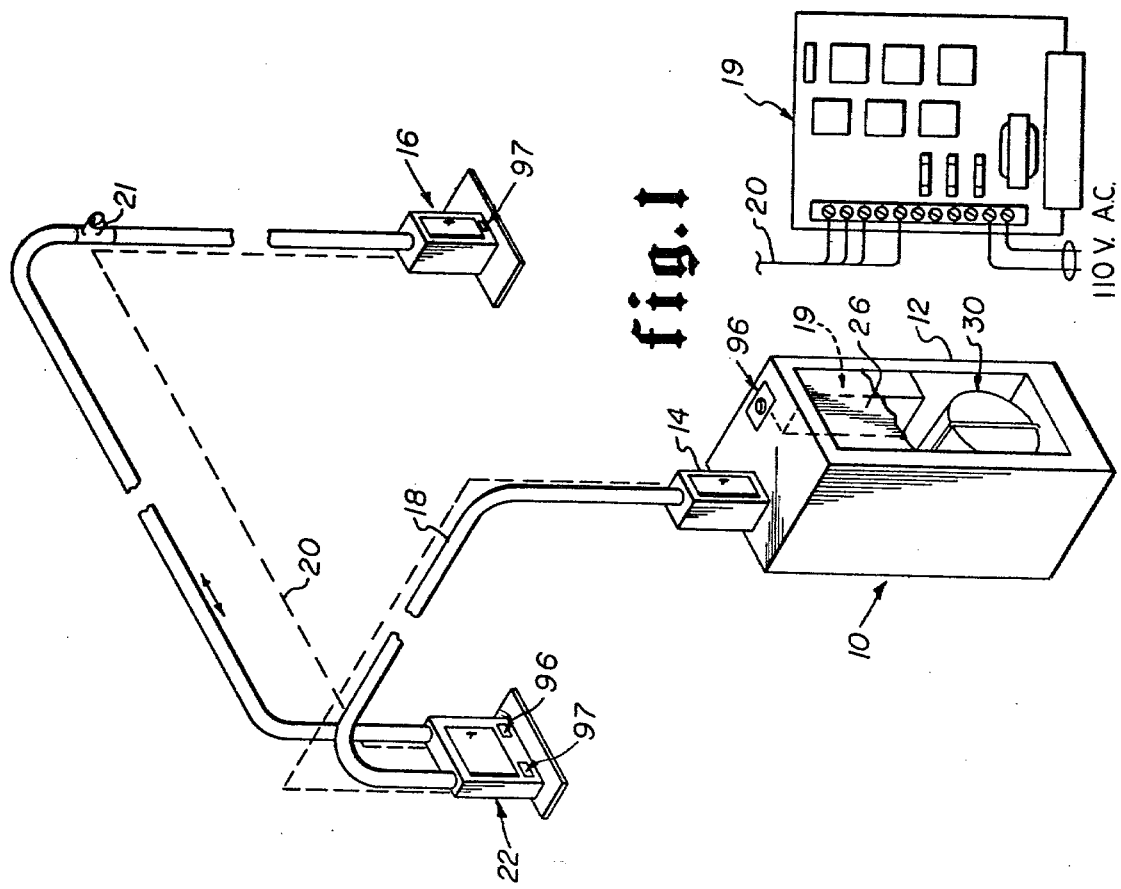
FIG. 1 is a general diagrammatic view showing the novel single tube pneumatic system of the present invention having one intermediate station.

As can be seen in FIG. 1, the basic single line pneumatic tube system of the present invention is comprised of a central station 10 which includes a power unit 12, and a central terminal 14, an end terminal 16, and tubing 18 connecting the terminals. The electronics 19 are located in the power unit and low voltage wiring 20 provides electrical connection between terminals. The tubing remote from the end terminal is provided with a flapper air relief valve 21 which will automatically exhaust air after a carrier has passed the air relief valve and therefore there is no air exhaust at the end terminal and practically no noise to disturb personnel in the area. If desired one or more intermediate terminals 22 may be incorporated into the system. The system is so designed that it may be packaged and sold by a manufacturer as a complete system eliminating custom design.

Figure 3:
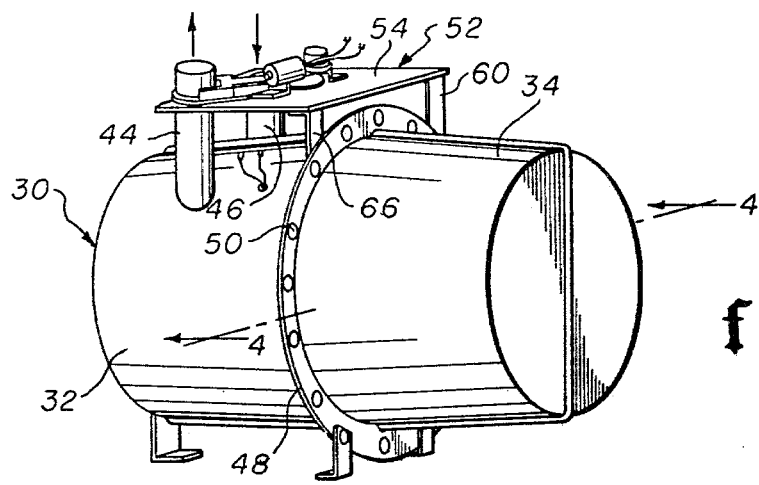
FIG. 3 is an isometric view of the pressure-vacuum chamber and air shifter valve.
Figure 4:
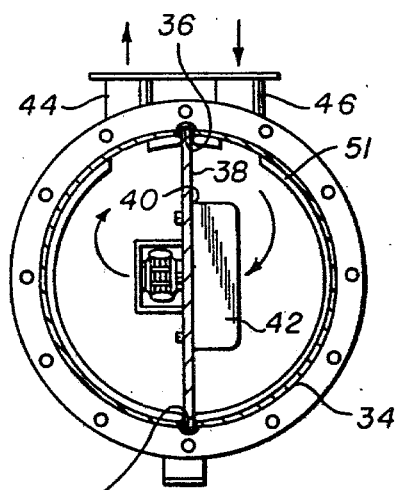
FIG. 4 is a cross sectional view taken along lines 4—4 of FIG. 3.
Figure 6:
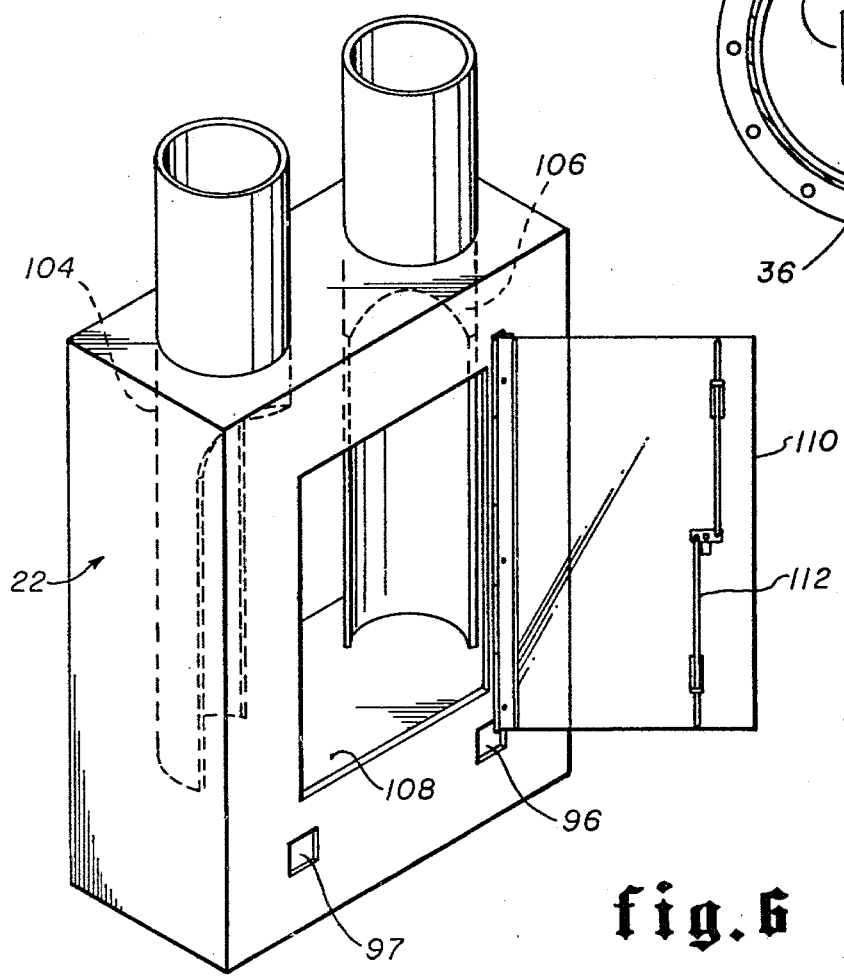

The central station is so designed that it resembles office furniture with the noise level being sufficiently low that it will not disturb normal office operations. The central station containing power unit 12 is the heart of the system replacing the high noise level turbine traditionally used to produce the air for the system. Moreover, the power unit 12 provides both pressure and vacuum for the entire system. The power unit 12 is formed of a rectangular sheet metal housing 24 having a removable front panel 26. All six interior sides of the housing are provided with acoustical padding 28, which may be sheets of polyester. A pressure-vacuum chamber 30 located in power unit 12 provides both pressure and vacuum, see FIG. 3. The chamber 30 is formed of two rimmed truncated cone housings 32-34 which may be vacuum formed ABS. Each housing member has diametrically opposed longitudinally extending grooves 36-36. As seen in FIG. 4, a central partition plate 38 is located in grooves 36-36. Partition 38 has at least one motor aperture 40 in which is mounted a flow through blower 42. The partition 38 is sealed in the grooves and the motor is sealed in the aperture so that when the chamber is assembled there is a pressure side and vacuum side. It has been found that Lamb Vacuum Motor, Model 115750 having a 2" orifice operates very satisfactorily producing volume of approximately 110 cfm and a vacuum of 3.4 (inches $H_2O$). The number of motors mounted in the partition 38 will depend upon the size of the system. It has been found that one motor is sufficient for a 2½" or a 3" system, two motors for a 4" or 4½" system and three motors for a 4"×7" system delivering carriers at a speed of approximately twenty five feet per second. Accordingly, partition 38 will have the requisite number of apertures for the system. Front housing member 32 is provided with a pressure port 44 and a vacuum port 46 which are in communication with the pressure and vacuum side of the chamber respectively. The rims 48 of the housing members are provided with apertures and secured together by fasteners 50. To cut down on noise, the inside of the chamber is provided with a layer of acoustical padding 51 which may be sheet polyester. Thus pressure-vacuum chamber provides both air pressure to move a carrier from the central terminal to a remote terminal and vacuum to return the carrier from a remote terminal to the central terminal.

The entire disclosure of co-pending application Ser. No. 876,112, filed Feb. 8, 1978, now U.S. Pat. No. 4,189,261, is incorporated herein by reference. The Patent provides a detailed description of the other components used in the instant pneumatic tube system. The reference numbers used in the Patent correspond to the numbers used in the instant drawings.

As can be seen from the foregoing, the penumatic tube system of the present invention is so designed that it may be packaged as a unit and easily installed. The central station includes the power unit and central terminal and the only electrical connection is attachment to a normal 120 volt alternating current outlet. Both pressure and vacuum is provided by the novel pressure-vacuum chamber that is powered by small flow through blowers.

What is claimed is:

1. A power unit for a pneumatic tube system comprising a housing having a shape substantially resembling two truncated conical sections with a common base, a longitudinally extending axial partition plate dividing the housing into two chambers, two side-by-side ports in the housing, at least one flow-through blower mounted in the partition plate, each chamber being provided with one of the ports, one being a pressure port, the other a vacuum port, wherein the housing is formed of two vacuum formed plastic truncated conical members having conical walls with open large ends and closed small ends and annular rims about the open ends, both of said ports being provided in one of the members, an inward facing groove extending longitudinally along the conical walls and diametrally along the closed ends, the partition plate being sealingly located in the groove, and means for attaching the rims of the two members together.

2. The power unit specified in claim 1 wherein the housing has inner surfaces provided with acoustical padding.

3. The power unit specified in claim 2 wherein the acoustical padding comprises sheet polyester.

4. A power unit for a single line penumatic tube carrier delivery system comprising a rectangular housing having six walls each of which is provided with acoustical padding and one of which has a removable access panel, a pressure-vacuum chamber having two ports mounted within the housing, the chamber having a partition plate dividing the chamber into two chambers, at least one flow-through blower mounted in the partition plate, each chamber being provided with one of the ports, one being a pressure port, the other a vacuum port, wherein the pressure-vacuum chamber is formed of two vacuum formed plastic truncated conical members having conical walls terminating in open large ends surrounded by outward extending rims and having longitudinal inward facing grooves, the partition plate being located in the grooves, and means for attaching the rims of the two members together.

5. A power unit for a single line pneumatic tube carrier delivery system comprising a rectangular housing having six walls each of which is provided with acoustical padding and one of which has a removable access panel, a pressure-vacuum chamber having two ports mounted within the housing, the chamber having a partition plate dividing the chamber into two chambers, at least one flow-through blower mounted in the partition plate, each chamber being provided with one of the ports, one being a pressure port, the other a vacuum port, wherein the pressure-vacuum chamber has a shape substantially resembling two conical sections with a common base, the partition plate is a longitudinally extending axial partition plate dividing the chamber into two chambers, and the ports are mounted side-by-side within the housing, and wherein the pressure-vacuum chamber is formed of two vacuum formed plastic truncated conical members having conical walls with open large ends and closed small ends and annular rims about the open ends, both of said ports being provided in one of the members, an inward facing groove extending longitudinally along the conical walls and diametrally along the closed ends, the partition plate being sealingly located in the groove, and means for attaching the rims of the two members together.

6. The power unit specified in claims 4 or 5 wherein the housing is formed of sheet metal.

7. The power unit specified in claims 4 or 5 wherein the acoustical padding comprises sheets of polyester.

8. The power unit specified in claims 4 or 5 wherein the acoustical padding is provided on inner surfaces of the walls of the rectangular housing.

9. The power unit specified in claims 1, 4 or 5 wherein the blower extends through and is sealingly mounted in an aperture in the partition plate.

10. The power unit specified in claims 1, 4 or 5 wherein a plurality of blowers are mounted in the partition plate.

* * * * *